F. Schutte,
Wood Molding Machine.
N° 23,991. Patented May 10, 1859.
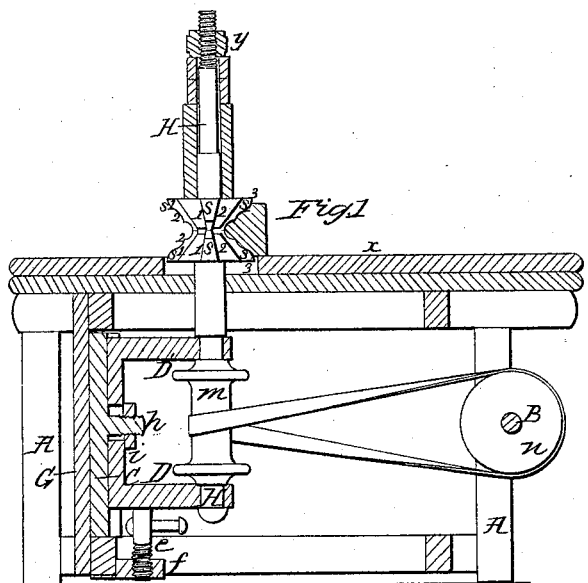
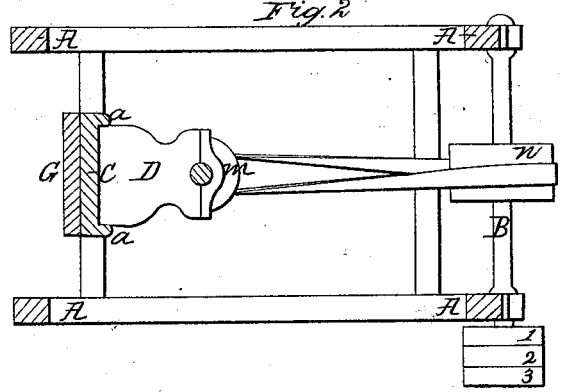
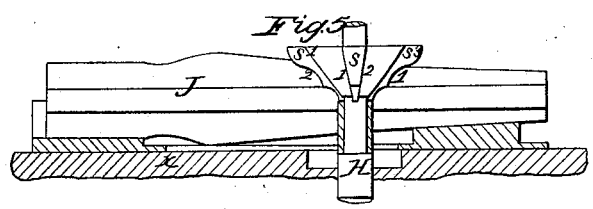
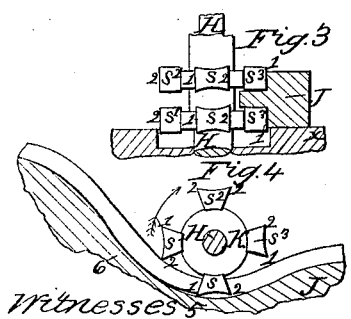
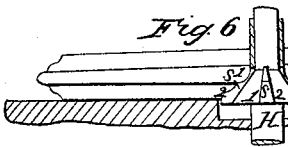
Witnesses
Henry Howson
Horace See
Inventor:
Friedrich Schutte

UNITED STATES PATENT OFFICE.

FRIEDRICK SCHUTTE, OF PHILADELPHIA, PENNSYLVANIA, ASSIGNOR TO HIMSELF AND PHILIP P. WEIS, OF SAME PLACE.

ROTARY CUTTER AND MODE OF OPERATING IT FOR MOLDINGS.

Specification of Letters Patent No. 23,991, dated May 10, 1859.

*To all whom it may concern:*

Be it known that I, FRIEDRICK SCHUTTE, of the city and county of Philadelphia and State of Pennsylvania, have invented a new and useful Improvement in Machinery for Cutting Curved Moldings; and I do hereby declare the following to be a full, clear, and exact description of the same, reference being had to the accompanying drawing and to the letters of reference marked thereon.

My invention relates to a peculiar construction of revolving cutters for forming the tongues, grooves, beads, and hollows, of curved moldings, and my invention consists in constructing a revolving cutter with any convenient number of double cutting edges, one edge being the reverse of the other in each pair, so that one edge shall operate on the wood while the other acts as a guard to prevent the cutting edge from penetrating too deep and so that when the direction of the revolving cutter is changed the edge which previously acted as a guard shall become the cutting edge and that which previously acted as a cutting edge shall become the guard as fully described hereafter. The revolving cutter thus constructed is hung to a spindle which by means of any suitable appliances can have the direction of rotation changed by the foot or hand of the attendant.

The object of my invention is to continue the cutting of a curved molding throughout all changes which may occur in the direction of the grain of the wood, without any interruption or alteration other than the simple reversing of the cutter; and also to insure the cut surface being clean, smooth, and uniform.

In order to enable others skilled in this class of machinery to make and use my invention I will now proceed to describe its construction and operation.

On reference to the accompanying drawing which forms a part of this specification, Figure 1 is a sectional elevation of my improved machine for cutting curved moldings. Fig. 2 a sectional plan. Figs. 3 and 4, views showing the cutters arranged for forming a tongue on a curved molding. Fig. 5, illustrates a cutter arranged for forming a curved molding with a bead of one thickness. Fig. 6, a cutter arranged to form a curved molding with tapering bead.

Similar letters refer to similar parts throughout the several views.

A, is the frame or table of the machine and B, is the driving shaft turning in suitable boxes attached to two of the table's legs.

A vertical board G, is secured at the top, and bottom to the table and to this board is attached the plate C, against which slides the bracket or headstock D. Lugs $a$, $a$, maintain this headstock in its proper lateral position and its position vertically may be adjusted by a screw $e$, in the bucket F, the latter being permanently attached to one of the transverse bars of the table. A screw $h$, projects from the plate $c$, through an oblong opening in the headstock, a nut $i$, on the screw serving to secure the headstock after adjustment.

The cutter spindle H, is arranged to turn in the upper and lower projections of the headstock between which it is furnished with a pulley $m$, embraced by a belt which passes round the pulley $n$, of the driving shaft B. The latter has on one end three pulleys, $q$, $q^1$, and $q^2$, around which pass the two belts from a pulley on any adjacent shaft one belt being straight and the other crossed. The middle pulley $q^1$, is loose and the two outside pulleys fast on the shaft so that the straps may be so moved that first the crossed and then the straight straps may be caused to turn the shaft which will consequently be reversed at every change of the straps.

The movement of the belts may be accomplished by any of the many devices used for the same purpose in machine shops the devices being such however that the attendant at the machine can control the movement by his feet or hands.

The spindle H, projects through an opening the top $x$, of the table and is furnished with a nut $y$, and suitable washers for securing the cutters. The latter are of peculiar construction and form the main feature of my improvement. This feature will be best observed on reference to Figs. 3, and 4, which illustrate cutters arranged to cut a tongue on the curved molding J.

In the plan view Fig. 4, K is the hub of the cutter and from this hub project four pieces of steel each piece having two cutting edges 1, and 2, the cutting edges of all the cutters being at equal distances from the center of rotation. The cutter is supposed to be turning in the direction of the arrow and the edge 1, of the double edged piece $s$, to be acting on the curved molding J, at the point (5). Now it will be observed that this point 1, cannot take a cut beyond a certain depth this depth being decided by the cutting point 2 of the same double edged piece $s$, for as the cutter revolves in the direction of the arrow the cutting point 2 is bearing with its inclined side against that portion of the molding just operated upon by the cutting point 1, without penetrating the molding however inasmuch as it is moving in a contrary direction to that required for cutting so that it serves the purpose of a guard to prevent the cutting point 1, from penetrating too deep.

As the whole of the four pieces $s$, $s^1$, $s^2$, $s^3$, are formed alike and as the entire cutter revolves at a rapid speed it is evident that no slip of the attendant's hand or other accident can cause the cutting points to shave off more than sufficient to form a clean smooth surface.

There is another important advantage in my improved double edged cutting pieces which will also be best observed on reference to Fig. 4 in which the grain of the wood of the molding is represented by the diagonal lines. The cutting edge, 1, of the four steel pieces are there shown as operating one after the other in the direction or with the grain of the wood, by the time the molding has been moved so far that the point 6 is presented to the revolving cutter the edges 1, if they continue to move in the direction of the arrow, will be cutting against the grain and leaving a rough surface. Before arriving at this point however and the moment the grain of the wood changes its direction as regards that in which the cutter revolves the attendant applies his hand or foot to the device by which the straps are moved on the pulleys $q$, $q^1$, $q^2$, thereby instantaneously changing the direction of the cutters so that the cutting edges 2, of the four pieces shave off the molding in the direction of the grain while the cutting edges 1, serve as the guards to prevent the penetration of the points 2, to too great a depth.

It will be seen that however crooked or however many curves there may be in the molding it is operated on throughout without interruption by simply changing the direction of the cutters and without turning over the molding which is resorted to in machines with cutters of the ordinary construction.

The cutters may be made of any form so as to be adapted to the bends of the molding as seen in Figs. 1, 5 and 6, and still the same feature of two adjacent cutting edges, one edge to cut while the other acts as a guard may be preserved.

Various devices may be applied for suddenly changing the direction of the revolution equally as efficiently as the moving straps above described. The frame of the machine may be also altered and arranged differently from that described without interfering with my improvement.

Without confining myself therefore to any particular form of frame or to any specific mode of reversing the cutter, I claim and desire to secure by Letters Patent—

A revolving cutter with any convenient number of double cutting edges of the form of the tongue groove bead or hollows to be cut, one cutting edge being the reverse of the other in each pair, so that one cutting edge only of each pair shall have a cutting effect when the cutter revolves in one direction, the other edge to cut when the cutter revolves in a contrary direction, and so that one cutting edge of each pair shall act as a guard to prevent the adjacent edge from penetrating two deep into the wood; when the said cutter with double cutting edges thus constructed is secured to a spindle capable of having the direction of its rotation readily reversed as, and for the purpose set forth.

In testimony whereof, I have signed my name to this specification in the presence of two subscribing witnesses.

FRIEDRICK SCHUTTE.

Witnesses:
HENRY HOWSON,
C. E. FOSTER.